United States Patent [19]
Ishigami

[11] 3,930,222
[45] Dec. 30, 1975

[54] MONITORING DEVICE FOR HYDRAULIC BRAKE SYSTEM

[75] Inventor: Noriakira Ishigami, Chiryu, Japan

[73] Assignee: Aisin Seiki Kabushiki Kaisha, Kariya, Japan

[22] Filed: Dec. 26, 1974

[21] Appl. No.: 536,395

[30] Foreign Application Priority Data
Dec. 27, 1973 Japan.............................. 48-3101
Mar. 19, 1974 Japan............................ 49-32081
June 26, 1974 Japan............................ 49-73536

[52] U.S. Cl.......... 340/52 C; 340/244 E; 200/82 D; 303/6 C
[51] Int. Cl.²........................................ B60T 17/22
[58] Field of Search.............. 340/52 C, 242, 244 E; 303/6 C, 84 A; 188/151 A; 200/82 D

[56] References Cited
UNITED STATES PATENTS
| | | | |
|---|---|---|---|
| 3,614,169 | 10/1971 | Bueler............................ | 340/52 C X |
| 3,669,506 | 6/1972 | Papin et al..................... | 340/52 C X |
| 3,708,211 | 1/1973 | Bueler............................ | 303/6 C |

Primary Examiner—Alvin H. Waring

[57] ABSTRACT

A monitoring device for detecting breakage in braking fluid pressure circuits including therein a fluid control device to regulate the braking fluid pressure applied to the rear wheel brake cylinders, which comprises a plunger slidably engaged at its one portion with a first bore in a cylinder housing to form a first pressure chamber in communication with the front wheel brake cylinders and at its other portion with the small diameter bore of a stepped bore in the cylinder housing to form a third pressure chamber in communication with the rear wheel brake cylinders, a sleeve slidably engaged with the large diameter bore of the stepped bore passing the plunger therethrough to form a second pressure chamber in communication with a fluid pressure source at one end face thereof, the sleeve being biased toward the second pressure chamber and separably engaged at its other end with a portion of the plunger, and a warning device mounted on the cylinder housing to be activated by movement of the plunger to alarm breakage in the braking fluid pressure circuits.

10 Claims, 3 Drawing Figures

MONITORING DEVICE FOR HYDRAULIC BRAKE SYSTEM

BACKGROUND OF THE INVENTION

The present invention relates to a hydraulic brake system for a vehicle, and more particularly to an improved monitoring device for detecting damage or breakage in braking fluid pressure circuits including therein a fluid control device to regulate the braking fluid pressure applied to the rear wheel brake cylinders.

SUMMARY OF THE INVENTION

The prime object of the present invention is to provide a monitoring device which can detect breakage or operation changes of a fluid control device as an antiskid pressure control valve provided within the braking fluid pressure circuits as well as breakage in the braking fluid pressure circuits of the system.

Another object of the present invention is to provide a monitoring device, having the above-mentioned characteristics, wherein when damage or breakage in the braking fluid pressure circuit for the front wheel brake cylinders is detected, a bypass circuit can be conducted to ensure the braking fluid pressure to be applied to the rear wheel brake cylinders.

A further object of the present invention is to provide a monitoring device, having the above-mentioned characteristics, wherein the danger warning is maintained until the breakage or operation changes as mentioned is all eliminated.

A still further object of the present invention is to provide a monitoring device, having the above-mentioned characteristics, applicable for a hydraulic brake system including other fluid control devices such as a conventional load sensing proportioning valve and the like.

According to the present invention briefly summarized, there is provided with a device for monitoring breakage in a hydraulic brake system of a vehicle having a first braking fluid pressure circuit connecting a tandem master cylinder with the front wheel brake cylinders and a second braking fluid pressure circuit connecting the master cylinder with the rear wheel brake cylinders and provided therein with a fluid control device to regulate the braking fluid pressure applied to the rear wheel brake cylinders. The monitoring device comprises a cylinder housing provided thereon with a first port to be connected with the first braking fluid pressure circuit, a second port to be connected directly with the master cylinder through the second braking fluid pressure circuit and a third port to be connected with the rear wheel brake cylinders through the second braking pressure circuit, the housing being provided therein with a first bore in communication with the first port and a second stepped bore communicated at its small diameter bore with the third port and at its large diameter bore with the second port; a plunger engaged slidably at its one portion with the first bore to form a first pressure chamber in communication with the front wheel brake cylinders through the first port and engaged slidably at its other portion with the small diameter bore of the stepped bore to form a third pressure chamber in communication with the rear wheel brake cylinders through the third port; a sleeve engaged slidably with the large diameter bore of the stepped bore to form a second pressure chamber in communication with the second port at one end face thereof, the plunger passing through the sleeve to be axially slidable and being engaged with the other end of the sleeve; resilient means for biasing the sleeve toward the second pressure chamber; and warning means provided on the cylinder housing to be activated in response to sliding movement of the plunger to alarm breakage in the hydraulic brake system.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
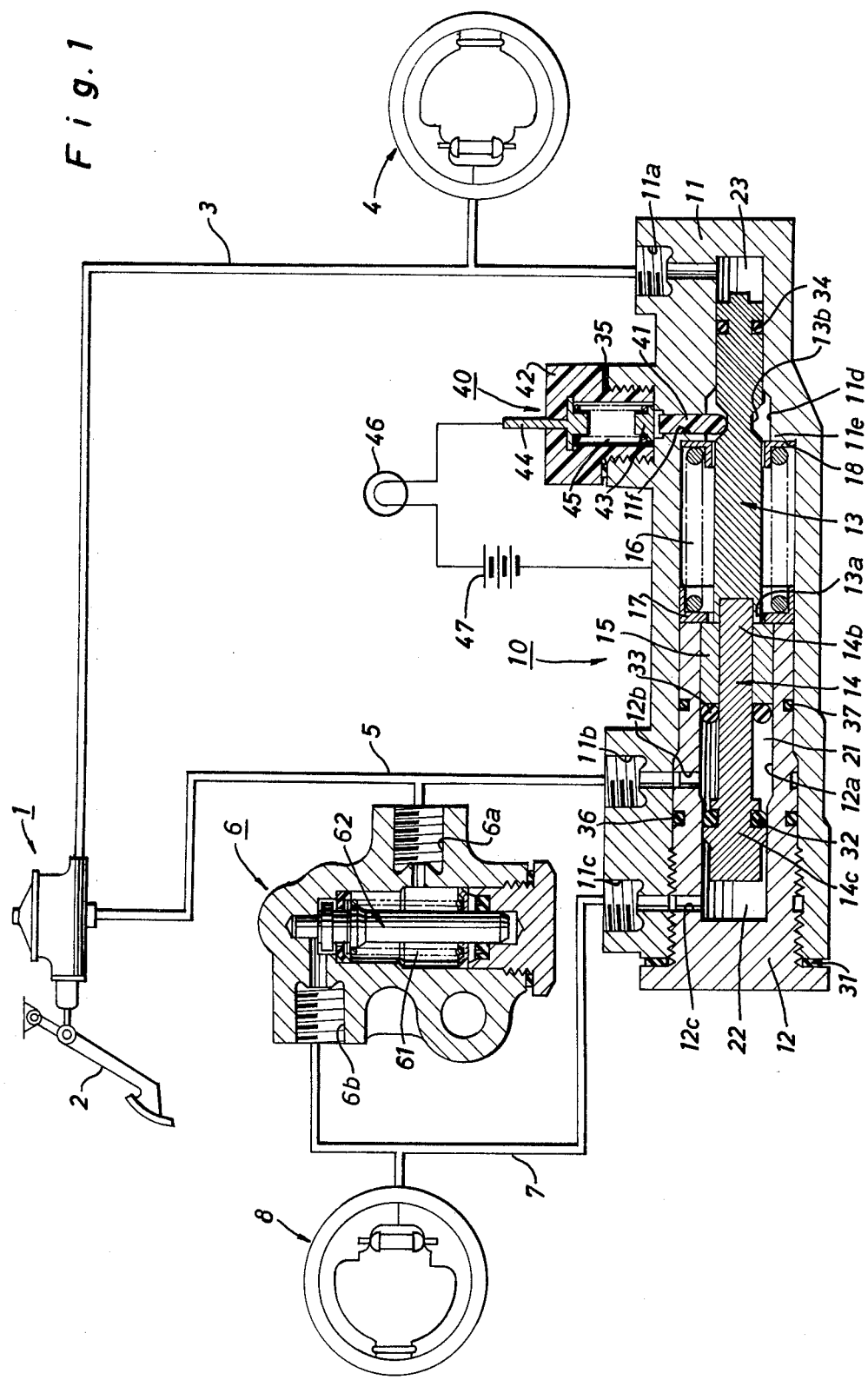
FIG. 1 depicts a hydraulic braking system including a monitoring device in accordance with the present invention, wherein a conventional pressure control valve is adapted.

Referring now in particular to FIG. 1 of the drawings, a conventional tandem master cylinder 1 to be actuated by a brake pedal 2 is connected at its first pressure chamber to the front wheel brake cylinders 4 and a first pilot port 11a of a monitoring device in accordance with the present invention by way of a first conduit or front braking circuit 3 and also connected at its second pressure chamber to the rear wheel brake cylinders 8 by way of a second conduit or rear braking circuit 5 and a conventional brake regulator 6. The second pressure chamber of the master cylinder 1 is further connected to a second pilot port 11b of the monitoring device 10 by way of the second conduit 5 and to a third pilot port 11c of the monitoring device 10 by way of the second conduit 5, the brake regulator 6 and a bypass conduit 7. The brake regulator 6 is of the construction heretofore in use, in which a differential piston 62 is, in its inoperative position, normally biased upward by a valve spring 61 to connect one chamber in communication with the master cylinder 1 through an inlet port 6a to another chamber in communication with the rear wheel brake cylinders 8 through an outlet port 6b. With this brake regulator 6, when the hydraulic braking pressure from the master cylinder 1 comes up to a predetermined value, the differential piston 62 moves downward against the biasing force of the valve spring 61 to close the communication between the inlet port 6a and the outlet port 6b and starts its operation to control the braking pressure applied to the rear wheel brake cylinders so as to prevent skidding of the vehicle.

The monitoring device 10 has a housing body 11 which is provided thereon with the first, second and third pilot ports 11a, 11b, 11c and includes a central stepped bore 11d closed by a threaded plug 12. The plug 12 is threaded in the housing body 11 through seal rings 36, 37 and an annular gasket 31 and provided therein with a stepped bore 12a which is communicated with the second and third pilot ports 11b and 11c through radial holes 12b and 12c respectively. Within the central stepped bore 11d, a first plunger 13 is slidably engaged with the small diameter portion of the bore 11*d* through a seal ring 34 to form a first pressure chamber 23 communicated with the master cylinder 1 and the front wheel brake cylinders 4 through the first pilot port 11*a* and the first conduit 3. The first plunger 13 is integrally connected with a second stepped plunger 14 which is slidably engaged at its larger diameter portion 14*c* with the small diameter portion of the stepped bore 12*a* of the plug 12 through a seal ring 32 to form a third pressure chamber 22 communicated with the rear wheel brake cylinders 8 through the third pilot port 11*c* and the bypass conduit 7. The small diameter portion 14*b* of the second stepped plunger 14 is slidable engaged with a sleeve 15 which is slidably engaged with the large diameter portion of the stepped bore 12*a* through a seal ring 33 to form a second pressure chamber 21 directly communicated with the master cylinder 1 through the second pilot port 11*b* and the second conduit 5. The sleeve 15 is detachably engaged with a shoulder 13*a* of the first plunger 13 and a collar 17 biased by a compression spring 16 surrounding the plunger 13. The collar 17 is received on the inner end of the plug 12 and the compression spring 16 is disposed between the collar 17 and a collar 18 received on a shoulder 11*e* of the housing body 11 to bias the sleeve 15 leftwardly through the collar 17 with a predetermined load given thereon.

A warning switch 40 mounted on the housing body 11 comprises a non-conductive feeler element 41 retractable within a radial hole 11*f* provided on the housing body 11 and a non-conductive plug 42 threaded on the housing body 11 through an annular gasket 35. The warning switch 40 further includes a conductive plate 43 assembled within the plug 42 to be retracted by the feeler element 41, a conductive terminal 44 mounted on the plug 42, and a conductive compression spring 45 interposed between the terminal 44 and the plate 43 to bias the plate 43 toward the upper surface of the housing body 11. The feeler element 41 is engaged at its inner end with an annular groove 13*b* of the first plunger 13 and at its outer end engageable with the plate 43. On the outer end of the terminal 44 connected is a warning lamp 46 to which is connected a vehicle battery 47 grounded at its negative pole. Thus, an electric closed circuit is composed of the battery 47, the lamp 46, the terminal 44, the spring 45, the plate 43 and the housing body 11 to normally light the warning lamp 46.

With this monitoring device 10 described above, when the hydraulic braking pressure from the master cylinder 1 is normally applied to the front and rear wheel brake cylinders 4 and 8 respectively and the function of the brake regulator 6 is normal, the first and second plungers 13 and 14 are centered until the brake regulator 6 starts its operation because the following formula is satisfied.

$$SF \times PF + F = SR \times PR + SW \times PW$$

In this formula,

| | |
|---|---|
| SF | The effective pressure receiving area of the first plunger 13 |
| PF | Pressure applied to the first pressure chamber 23 or the front wheel brake cylinders 4 from the master cylinder 1 |
| F | The biasing force of the spring 16 |
| SR | The effective pressure receiving area of the sleeve 15 |
| PR | Pressure applied to the second pressure chamber 21 from the master cylinder 1 |
| SW | The effective pressure receiving area of the large diameter portion of the second plunger 14 |
| PW | Pressure applied to the third pressure chamber 22 or the rear wheel brake cylinders 8 |

After the brake regulator 6 starts its operation to control the braking pressure applied to the rear wheel brake cylinders 8, the first and second plungers 13 and 14 are still centered in their original positions even though the pressure PW is lowered. Under this condition, the warning lamp 46 is energized.

When the braking fluid circuit for the front wheel brakes has been broken, the first and second plungers 13 and 14 move rightward in the figure together with the sleeve 15 to connect the second port 11*b* with the third port 11*c* through the second and third pressure chambers 21 and 22 because the following formula is satisfied.

$$SF \times PF + F < SR \times PR + SW \times PW$$

This causes bypass communication between the master cylinder 1 and the rear wheel brake cylinders 8 through the second conduit 5, the monitoring device 10 and the bypass conduit 7. At the same time, the feeler element 41 is retracted from its original position by the rightward movement of the first plunger 13 to separate the conductive plate 43 from the housing body 11 against the biasing force of the spring 45 thereby to open the electric closed circuit for the warning lamp 46. This deenergizes the warning lamp 46 to alarm the breakage of the front braking circuit to the operator of the vehicle. In this instance, after the actuation of the master cylinder 1 is released, only the sleeve 15 returns leftward by the biasing force of the spring 16, whereas the first and second plungers 13, 14 remain in the displaced position thereof to maintain the deenergization of the warning lamp 46.

When the braking fluid circuit for the rear wheel brakes has been broken, the first and second plungers 13 and 14 move leftward in the figure together with the sleeve 15 because the following formula is satisfied.

$$SF \times PF + F > SR \times PR + SW \times PW$$

This retracts the feeler element 41 from its original position in response to the leftward movement of the first plunger 13 to open the electric closed circuit for the warning lamp 46, and then the lamp 46 deenergizes to alarm the breakage of the rear braking circuit to the operator.

In case the braking fluid pressure applied to the rear wheel brake cylinders 8 may not be controlled due to damage of the brake regulator 6, the first and second plungers 13 and 14 move rightward in the figure together with the sleeve 15 because the following formula is satisfied in course of the braking operation of the vehicle.

$$SF \times PF + F < SR \times PR + SW \times PW$$

This retracts the feeler element 41 from its original position in response to the rightward movement of the first plunger 13 to open the electric closed circuit for the warning lamp 46, and then the lamp 46 deenergizes to alarm the damage of the brake regulator 6.

In case the braking fluid pressure to be applied to the rear wheel brake cylinders 8 may not satisfactorily be obtained due to the damage of the brake regulator 6, the first and second plungers 13 and 14 move leftward in the figure together with the sleeve 15 to retract the feeler element 41 because the following formula is satisfied in the final stage of the braking operation.

$$SF \times PF + F > SR \times PR + SW \times PW$$

This opens the electric closed circuit for the warning lamp 46 to deenergize the lamp 46 so as to alarm the damage of the brake regulator 6 to the operator.

Figure 2:
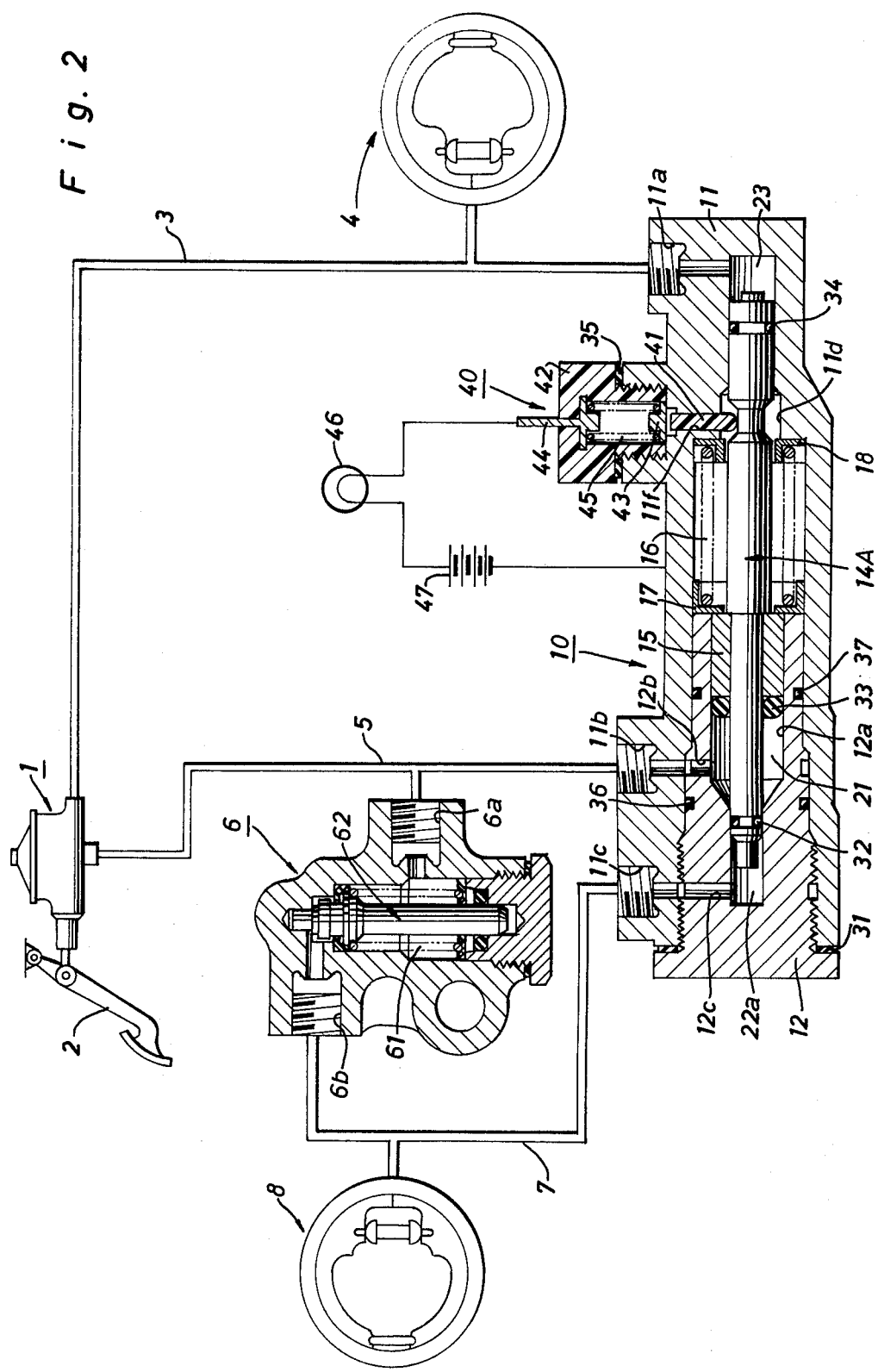
FIG. 2 illustrates a hydraulic braking system including a modification of the monitoring device shown in FIG. 1.

FIG. 2 illustrates a modification of the above-described embodiment, in which the first and second plungers 13 and 14 are replaced with a single plunger 14A designed to have the same function as that of the plungers 13 and 14. The plunger 14A is slidably engaged at the small diameter portion thereof with the sleeve 15 and the small diameter portion of the stepped bore 12a to form the third pressure chamber 22a. All other constructions are substantially same as those of the above-mentioned embodiment.

Figure 3:
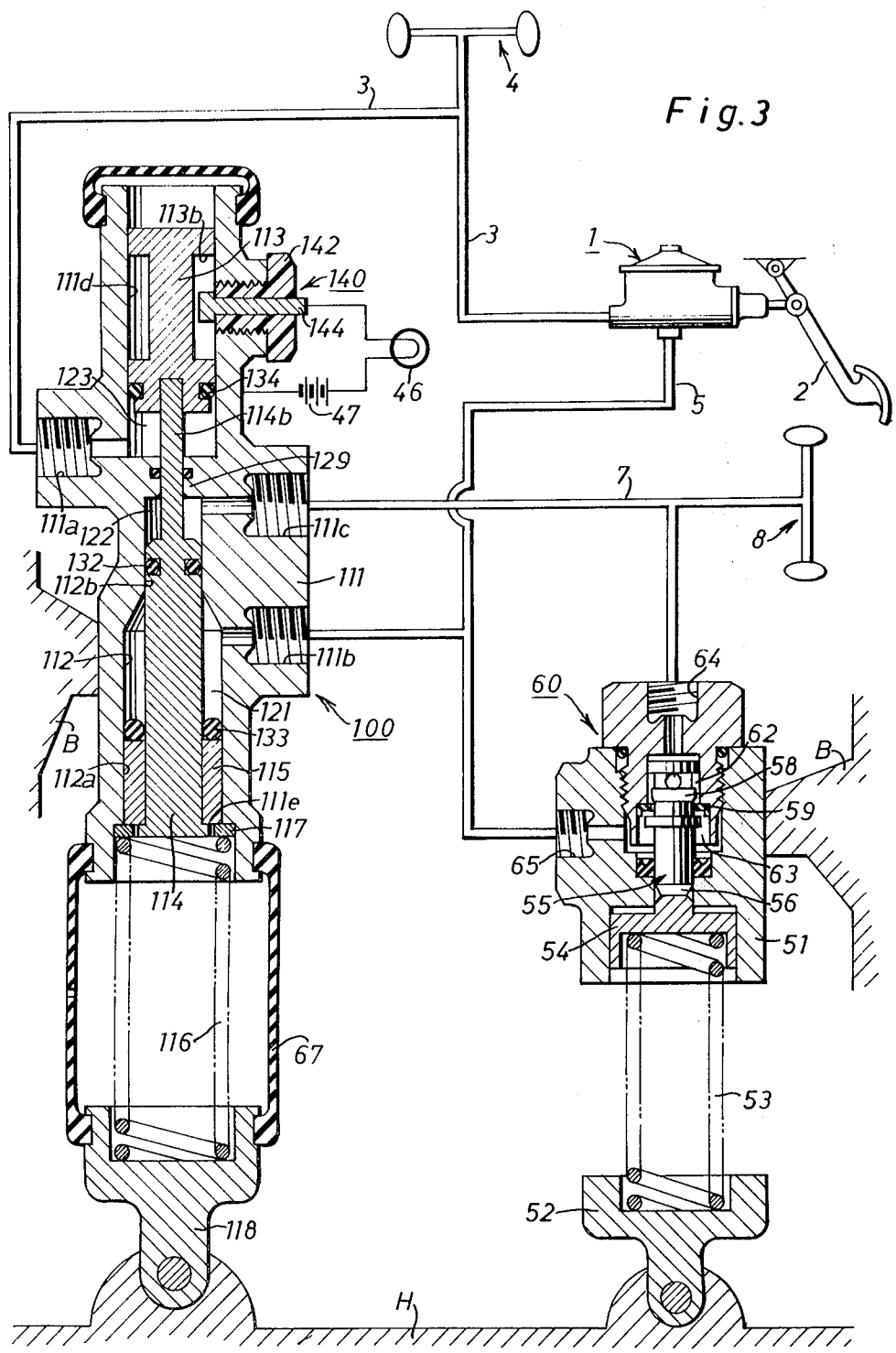
FIG. 3 illustrates a hydraulic braking system including another embodiment of the monitoring device shown in FIG. 1, wherein a conventional load sensing proportioning valve is adapted.

FIG. 3 illustrates another embodiment of the present invention, in which the brake regulator 6 and the monitoring device 10 of the previous embodiment are replaced with a conventional load sensing proportioning valve 60 and a monitoring device 100. In FIG. 3, the tandem master cylinder 1 is connected at its first pressure chamber directly to the front wheel brake cylinders 4 and a first pilot port 111a of the monitoring device 100 by way of the first conduit 3 and also connected at its second pressure chamber to the rear wheel brake cylinders 8 by way of the second conduit 5 and the load sensing proportioning valve 60. The second pressure chamber of the master cylinder 1 is further connected directly to a second pilot port 111b of the monitoring device 100 by way of the second conduit 5 and to a third pilot port 111c of the monitoring device 100 by way of the second conduit 5, the load sensing proportioning valve 60 and the bypass conduit 7.

The monitoring device 100 has a housing body 111 which is mounted on the vehicle frame or body B and received at its bottom end by a joint member 118 pivoted on the rear wheel axle housing H by way of a coil spring 116 and a collar 117. The coil spring 116 engages at its lower end with the joint member 118 and at its upper end with a shoulder 111e of the housing body 111 through the annular collar 117 and is surrounded by a rubber boot 67 provided between the joint member 118 and the lower end of housing body 111.

Within a lower stepped bore 112 of the housing body 111, a sleeve 115 is slidably engaged to receive a stepped plunger 114 therein and received by the collar 117 at its bottom end. The stepped plunger 114 is slidably engaged at its upper portion with the small diameter portion of the stepped bore 112b through a seal ring 132 to form a third pressure chamber 122 communicated with the rear wheel brake cylinders 8 through the third pilot port 111c. The plunger 114 is also slidably engaged at its lower portion with the sleeve 115 through a seal ring 133 to form a second pressure chamber 121 communicated with the master cylinder 1 through the second pilot port 111b, the lower end shoulder of the plunger 114 being engaged with the bottom end of the sleeve 115.

Within an upper bore 111d of the housing body 111, a plunger 113 is slidably engaged through a seal ring 134 to form a first pressure chamber 123 communicated with the master cylinder 1 and the front wheel brake cylinders 4 through the first pilot port 111a. This plunger 113 is integrally connected with the small diameter portion 114b of the plunger 114 which is extended through a partition wall 129 of the housing body 111. A warning switch 140 mounted on the upper portion of the housing body 111 comprises a non-conductive plug 142 threaded in the housing 111 and a terminal 144 mounted on the plug 142. The inner end of the terminal 144 projects within an annular groove 113b of the plunger 113 to be engaged with the plunger 113 in response to the movement of the plungers 113 and 114. On the outer end of the terminal 144 connected is the warning lamp 46 to which is connected the vehicle battery 47 grounded at its negative pole. Thus, an electric open circuit is composed of the battery 47, the lamp 46, the terminal 144, the plunger 113 and the housing body 111 to normally deactivate the warning lamp 46.

The load sensing proportioning valve 60 is of the construction heretofore in use, in which a valve housing 51 is mounted on the vehicle frame or body B and received at its bottom end by a joint member 52 pivoted on the rear wheel axle housing H by way of a coil spring 53 and a retainer 54 in the same manner as the monitoring device 100. The coil spring 53 engages at its lower end with the joint member 52 and at its upper end with the retainer 54 which is slidable within a bottom bore of the valve housing 51. Within the valve housing 51, a differential piston 55 is, in its inoperative position, normally biased upward by the coil spring 53 through the retainer 54. A valve portion 58 of the piston 55 and a valve seat 59 are apart from each other in inoperative position connecting one chamber 63 in communication with the master cylinder 1 and the second pilot port 111b of the monitoring device 100 through an inlet port 65 to another chamber 62 in communication with the rear wheel brake cylinders 8 and the third pilot port 111c of the monitoring device 100 through an outlet port 64.

The hydraulic braking pressure from the master cylinder 1 amounting up to a predetermined value, the pressure which acts on a piston surface of the same area as the cross-section of the lower piston end 56, exceeds the load of the coil spring 53. This moves the piston 55 downward, causing the valve portion 58 to move snugly against the valve seat 59 and closing communication between the inlet and outlet ports 65 and 64. Then, the piston 55 moves upward to open the valve portion 58 urged by upward pressure on an annular area equivalent to the difference between areas of the cross-section of the piston 55 and the effective sealing bore of the valve seat 59 which is larger than the cross-section of the lower piston end 56. Through the valve portion 58 now opens, the inlet port 65 communicates with the outlet port 64 and some pressure fluid moves from the chamber 63 to the chamber 62, increasing the hydraulic pressure in the rear wheel brake cylinders 8.

The communication of the inlet port 65 with the outlet port 64 makes, as described above, the piston 55 move down, and while the hydraulic pressure supplied from the master cylinder 1 into the chamber 63 of the inlet is being increased by the brake pedal operation, the piston 55 continues its modulating operation to increase continuously the hydraulic pressure toward the rear wheel brake cylinders 8. In this operation, the hydraulic braking pressure in the rear wheel brake cylinders 8 increases as controlled to be lower than the hydraulic braking pressure applied to the front wheel brake cylinders 4 so as to prevent skidding of the vehicle. As described above, the piston 55 starts its operation when the hydraulic pressure comes up to the biasing force of the coil spring 53. The biasing force of the spring 53 varies in accordance with the changes of distance between the body frame and the wheel axle caused by the variable car load and/or the transfer of the center of gravity of the vehicle in braking wheel operations.

Described hereinafter is the operation of the monitoring device 100 in this embodiment, assuming that the relation between the effective biasing forces of the coil springs 116 and 53 satisfies the following inequalities.

$$SF > SW$$
$$SF > SR$$
$$SW + SR > SF$$
$$F_{116} / (SW + SR - SF) > F_{53} / S_{55}$$

In the above inequalities,

| | |
|---|---|
| SF | The effective pressure receiving area of the plunger 113 |
| Sw | The effective pressure receiving area of the stepped plunger 114 within the third pressure chamber 122 |
| SR | The effective pressure receiving area of the sleeve 115 |
| $F_{116}$ | The biasing force of the coil spring 116 |
| $F_{53}$ | The biasing force of the coil spring 53 |
| $S_{55}$ | The effective pressure receiving area of the small diameter portion of the piston 55 |

With the above-mentioned monitoring device 100, when the hydraulic braking pressure from the master cylinder 1 is normally applied to the front and rear wheel brake cylinders 4 and 8 respectively and the function of the load sensing proportioning valve 60 is normal, the plungers 113 and 114 are centered at the original position thereof until the load sensing proportioning valve 60 starts its operation because the following formula is satisfied.

$$SF \times PF + F_{116} = SR \times PR + SW \times PW$$

In this formula:

| | |
|---|---|
| PF | Pressure applied to the first pressure chamber 123 or the front wheel brake cylinders 4 from the master cylinder 1 |
| PR | Pressure applied to the second pressure chamber 121 from the master cylinder 1 |
| PW | Pressure applied to the third pressure chamber 122 or the rear wheel brake cylinders 8 |

After the load sensing proportioning valve 60 starts its operation to control the braking pressure applied to the rear wheel brake cylinders 8, the plungers 113 and 114 are still centered in their original positions even though the pressure PW is lowered because the effective biasing force of the coil spring 116 of the monitoring device 100 varies in accordance with the change of the effective biasing force of the coil spring 53 of the load sensing proportioning valve 60. In this instance, the warning lamp 46 is not lit.

When the braking fluid circuit for the front wheel brakes has been broken, the hydraulic braking pressure from the master cylinder 1 may not be supplied into the first pressure chamber 123 of the device 100, while the hydraulic braking pressure is supplied only into the second and third pressure chambers 121 and 122 of the device 100. This moves the plungers 113 and 114 downward together with the sleeve 115 against the biasing force of the coil spring 116 in the figure to connect the second port 111b with the third port 111c through the second and third pressure chambers 121 and 122. At the same time, the terminal 144 engages the plunger 113 in response to the downward movement of the plunger 113 to close the electric open circuit for the warning lamp 46. Then, the warning lamp 46 is lit to alarm the breakage of the front braking circuit to the operator of the vehicle. In this instance, after the actuation of the master cylinder 1 is released, only the sleeve 115 returns upward by the biasing force of the coil spring 116, whereas the plungers 113 and 114 remain in the downward displaced position thereof to maintain the energization of the warning lamp 46.

In case the braking fluid circuit for the rear wheel brakes has been broken, the braking fluid pressure is applied only to the first pressure chamber 123 of the device 100, and may not be applied to the second and third pressure chambers 121 and 122 of the device 100. As a result, the plungers 113 and 114 move upward together with the sleeve 115 to engage the terminal 144 with the plunger 113. This closes the electric open circuit for the lamp 46 to light the lamp 46 so as to alarm the breakage of the rear braking circuit to the operator.

In case the braking fluid pressure from the master cylinder 1 is directly applied to the rear wheel brake cylinders 8 due to damage of the load sensing proportioning valve 60, the plungers 113 and 114 move downward in the figure together with the sleeve 115 against the biasing force of the coil spring 116 by pressure difference (SW + SR − SF)PR caused after the operation of the load sensing proportioning valve 60. This engages the terminal 144 with the plunger 113 to light the warning lamp 46.

In case the braking fluid pressure from the master cylinder 1 is not applied to the rear wheel brake cylinders 8, the braking fluid pressure is applied only to the first and second pressure chambers 123 and 121 of the device 100. As a result, the plungers 113 and 114 move upward in the figure together with the sleeve 115 to engage the terminal 144 with the plunger 113 because the following formula is satisfied.

$$SF \times PF + F_{116} > SR \times PR$$

This closes the electric open circuit for the warning lamp 46 to light the lamp 46.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A device for monitoring breakage in a hydraulic brake system of a vehicle having a first braking fluid pressure circuit connecting a tandem master cylinder with the front wheel brake cylinders and a second braking fluid pressure circuit connecting the master cylinder with the rear wheel brake cylinders and provided therein with a fluid control device to regulate the braking fluid pressure applied to the rear wheel brake cylinders, said monitoring device comprising:

a cylinder housing provided thereon with a first port to be connected with said first braking fluid pressure circuit, a second port to be connected directly with said master cylinder through said second braking fluid pressure circuit and a third port to be connected with said rear wheel brake cylinders through said second braking pressure circuit, said housing being provided therein with a first bore in communication with said first port and a second stepped bore communicated at its small diameter bore with said third port and at its large diameter bore with said second port;

a plunger engaged slidably at its one portion with said first bore to form a first pressure chamber in communication with said front wheel brake cylinders through said first port and engaged slidably at its other portion with the small diameter bore of said stepped bore to form a third pressure chamber in communication with said rear wheel brake cylinders through said third port;

a sleeve member engaged slidably with the large diameter bore of said stepped bore to form a second pressure chamber in communication with said second port at one end face thereof, said plunger passing through said sleeve member to be slidable and being engaged with the other end of said sleeve member;

resilient means for biasing said sleeve toward said second pressure chamber; and warning means provided on said cylinder housing to be activated in response to sliding movement of said plunger to alarm breakage in said hydraulic brake system.

2. A device for monitoring breakage in a hydraulic brake system as set forth in claim 1, wherein said plunger comprises a first plunger element slidably engaged at its one end with said first bore to form said first pressure chamber and engaged separably at its other end with said sleeve and a second stepped plunger element engaged at its large diameter portion with said small diameter bore of said second stepped bore to from said third pressure chamber and integrally connected at its small diameter portion with the other end of said first plunger element through said sleeve and wherein said resilient means is a coil spring assembled within said cylinder housing in surrounding relationship to said first plunger element to bias said sleeve toward said second pressure chamber.

3. A device for monitoring breakage in a hydraulic brake system as set forth in claim 2, wherein the small diameter bore of said second stepped bore has an axial length to disengage the large diameter portion of said second stepped plunger therefrom when said plungers are moved toward said first pressure chamber.

4. A monitoring device as set forth in claim 2, wherein said warning means comprises a non-conductive feeler element provided on said cylinder housing to be retracted by sliding movement of said first plunger element, a normally closed switch means provided on said cylinder housing to be opened by the retraction of said feeler element and a warning element connected with said switch means to be deactivated by opening of said switch means.

5. A monitoring device as set forth in claim 1, wherein said plunger is a single stepped plunger engaged at its large diameter portion with said first bore to form said first pressure chamber and engaged at its small diameter portion with said small diameter bore of said second stepped bore through said sleeve to form said third pressure chamber, said sleeve being separably engaged with a shoulder of the large diameter portion of said stepped plunger to form said second pressure chamber and wherein said resilient means is a coil spring assembled within said cylinder housing in surrounding relationship to said single plunger to bias said sleeve toward said second pressure chamber.

6. A monitoring device as set forth in claim 5, wherein said warning means comprises a non-conductive feeler element provided on said cylinder housing to be retracted by sliding movement of said single plunger, a normally closed switch means provided on said cylinder housing to be opened by the retraction of said feeler element and a warning element connected with said switch means to be deactivated by opening of said switch means.

7. A monitoring device as set forth in claim 5, wherein the small diameter portion of said single stepped plunger has an axial length to disengage from said small diameter bore of said second stepped bore when said single plunger is moved toward said first pressure chamber.

8. A monitoring device as set forth in claim 1, wherein said fluid control device is a load sensing proportioning valve means for controlling the braking fluid pressure applied to the rear wheel brake cylinders as a function of the distance between a body frame and wheel axle supporting means separated from each other by a suspension system and wherein said cylinder housing is vertically mounted on said body frame, said first bore being provided within the upper portion of said housing and said second stepped bore being provided within the lower portion of said housing facing at its small diameter bore to said first bore through a partition wall of said housing, said plunger comprises a first plunger element slidably engaged with said first bore to form said first pressure chamber and a second stepped plunger element engaged at its large diameter portion with said small diameter bore of said second stepped bore to form said third pressure chamber and integrally connected with said first plunger at its small diameter portion extending through said partition wall, said sleeve is engaged with the large diameter bore of said stepped bore at the bottom portion of said housing passing said second plunger element therethrough to form said second pressure chamber at its upper face and separably engaged with the bottom end of said second plunger element, and said resilient means is interposed between the bottom end of said housing and said wheel axle supporting means to bias said sleeve toward said second pressure chamber in accordance with the function of said load sensing proportioning valve means.

9. A monitoring device as set forth in claim 8, wherein said warning means comprises a normally open switch means mounted on said cylinder housing to be closed by sliding movement of said first plunger element and a warning element connected with said switch means to be activated by closing of said switch means.

10. A monitoring device as set forth in claim 8, wherein the small diameter bore of said second stepped bore has an axial length to disengage the large diameter portion of said second plunger element therefrom when said plunger elements are moved against the biasing force of said resilient means downwardly.

* * * * *